United States Patent
Klose et al.

(10) Patent No.: US 10,800,529 B2
(45) Date of Patent: Oct. 13, 2020

(54) PASSENGER SUPPLY UNIT FOR AN AIRCRAFT CABIN

(71) Applicant: Airbus Operations GmbH, Hamburg (DE)

(72) Inventors: Peter Klose, Hamburg (DE); Wolfgang Fischer, Hamburg (DE); Matthias Schmitt, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 151 days.

(21) Appl. No.: 15/708,881

(22) Filed: Sep. 19, 2017

(65) Prior Publication Data
US 2018/0079507 A1    Mar. 22, 2018

(30) Foreign Application Priority Data
Sep. 22, 2016    (EP) .................................... 16190222

(51) Int. Cl.
| | |
|---|---|
| *B64D 11/00* | (2006.01) |
| *B64D 13/00* | (2006.01) |
| *B64C 1/14* | (2006.01) |
| *E06B 9/24* | (2006.01) |

(52) U.S. Cl.
CPC ............ *B64D 11/00* (2013.01); *B64C 1/1476* (2013.01); *B64D 11/0015* (2013.01); *B64D 13/00* (2013.01); *E06B 9/24* (2013.01); *B64D 2011/0053* (2013.01)

(58) Field of Classification Search
CPC .......................... B64D 11/00; B64D 11/0015
See application file for complete search history.

(56) References Cited

U.S. PATENT DOCUMENTS

| | | | |
|---|---|---|---|
| 8,348,455 B2 * | 1/2013 | Kessler ................... | B60Q 3/47 |
| | | | 362/227 |
| 9,016,627 B2 | 4/2015 | Margis et al. | |
| 9,092,136 B1 * | 7/2015 | Patel ................... | G06F 3/04886 |
| 2010/0253241 A1 * | 10/2010 | Van Endert ............ | H03K 17/94 |
| | | | 315/291 |
| 2011/0266392 A1 | 11/2011 | Goehlich et al. | |

(Continued)

FOREIGN PATENT DOCUMENTS

| | | |
|---|---|---|
| WO | WO 2012/034111 A1 | 3/2012 |
| WO | WO 2013/076204 A1 | 5/2013 |
| WO | WO 2015/130567 A1 | 9/2015 |

OTHER PUBLICATIONS

Extended European Search Report for Application No. 16190222 dated Feb. 15, 2017.

(Continued)

*Primary Examiner* — Alvin C Chin-Shue
(74) *Attorney, Agent, or Firm* — Jenkins, Wilson, Taylor & Hunt, P.A.

(57) ABSTRACT

A passenger supply unit for an aircraft cabin, including an input device for detecting a control command from a passenger, and for outputting a control signal to a further device for controlling the further device according to the control command. A passenger supply unit can be controlled by a passenger independent of its height above the passenger seat. The unit can be independent from an in-flight entertainment system. The input device includes a contact free sensor to detect the control command without being contacted by a passenger.

17 Claims, 2 Drawing Sheets

(56) References Cited

U.S. PATENT DOCUMENTS

| | | | | |
|---|---|---|---|---|
| 2012/0223646 | A1* | 9/2012 | Recker | G08B 5/36 |
| | | | | 315/152 |
| 2012/0292986 | A1* | 11/2012 | Riedel | B64D 11/0693 |
| | | | | 307/9.1 |
| 2013/0027954 | A1* | 1/2013 | Boomgarden | B64D 11/00 |
| | | | | 362/510 |
| 2013/0120238 | A1 | 5/2013 | Spaulding et al. | |
| 2013/0293722 | A1* | 11/2013 | Chen | F21V 14/02 |
| | | | | 348/164 |
| 2014/0340916 | A1* | 11/2014 | Riitner | G06F 3/00 |
| | | | | 362/470 |
| 2015/0014481 | A1* | 1/2015 | Vandewall | B64D 11/0007 |
| | | | | 244/118.5 |
| 2015/0340916 | A1* | 11/2015 | Kang | F04D 17/08 |
| | | | | 310/156.12 |
| 2017/0073074 | A1* | 3/2017 | Gagnon | B64D 11/00 |

OTHER PUBLICATIONS

European Office Action for Application No. 16190222.6 dated Feb. 26, 2019.

\* cited by examiner

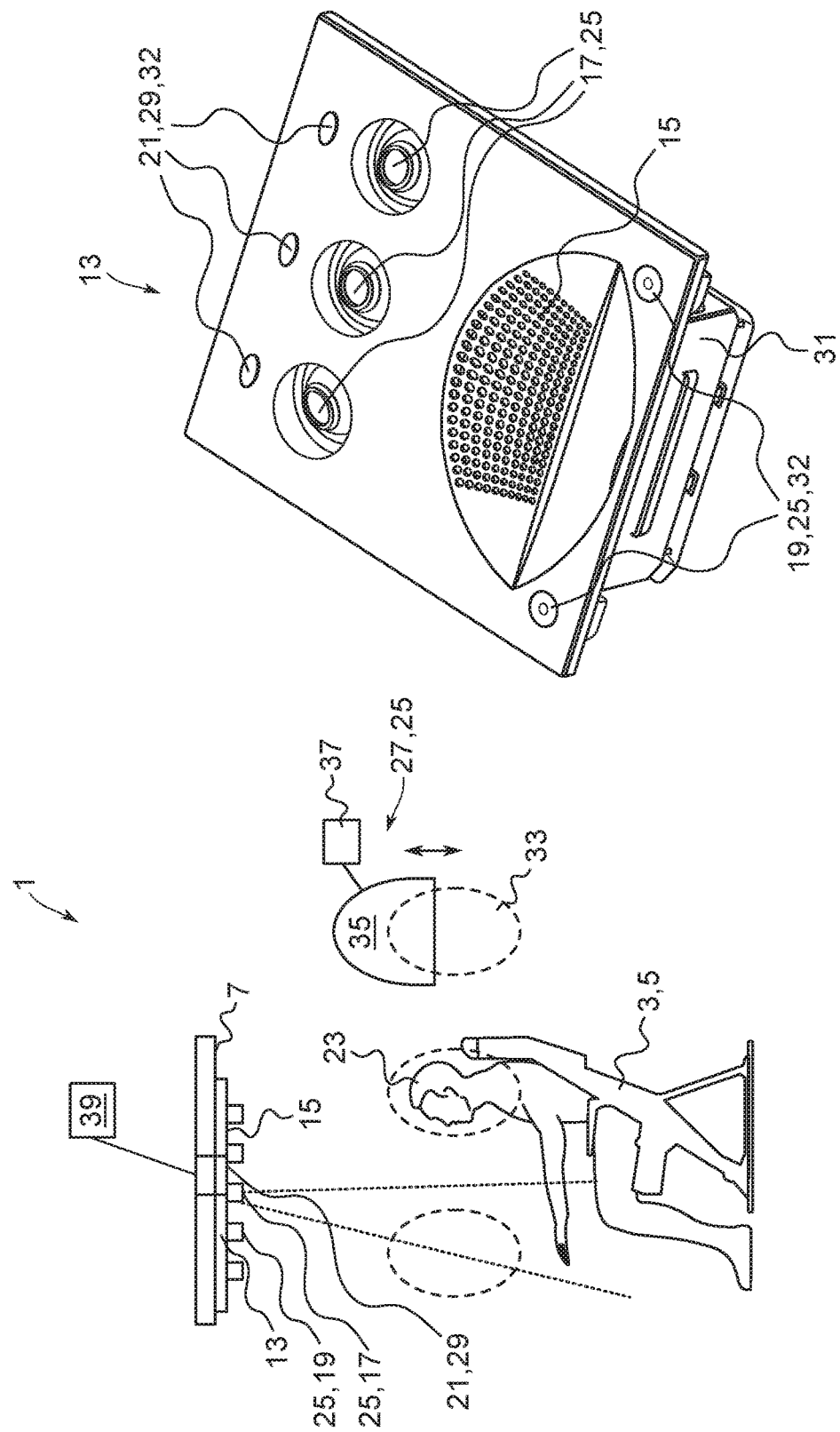

PASSENGER SUPPLY UNIT FOR AN AIRCRAFT CABIN

CROSS-REFERENCE TO RELATED APPLICATION

This application claims priority to European Patent Application No. 16190222.6 filed Sep. 22, 2016, the entire disclosure of which is incorporated by reference herein.

TECHNICAL FIELD

The present disclosure relates to a passenger supply unit (PSU) for an aircraft cabin.

BACKGROUND

Such passenger supply unit is usually installed or adapted for being installed in a ceiling section of an aircraft cabin above a passenger seat, and provides various functions for a passenger sitting in a passenger seat below the passenger supply unit, such as e.g. loudspeakers, reading lights, information and warning signs, or passenger call buttons. Apart from the ceiling section, such passenger supply unit might also be installed in a lavatory, a galley, a crew area or a door area of an aircraft cabin. A further aspect of the present disclosure relates to an aircraft cabin comprising such a passenger supply unit.

The passenger supply unit comprises an input device configured for detecting a control command from a passenger, i.e. configured for a passenger to input the control command, and for outputting a control signal to a further device for controlling the further device according to the control command. Preferably, the input device further comprises a processing unit that is configured for receiving and processing a sensor signal received from the input device, for generating the control signal in dependence of the sensor signal, and for outputting the control signal to the further device.

As according to the prior art, the further device can be formed e.g. as a reading light or as a passenger call display e.g. in the form of a lamp, wherein the input device can be formed as one or more buttons and the control command can relate to a switching on or switching off of the reading light or to a call by a passenger for a flight attendant. However, in several aircraft models, in particular in the case of wide-body fuselage or double-aisle cabin models, the ceiling section above the passenger seats with the passenger supply units provided therein is so high above that a passenger sitting in the passenger seat can hardly reach the passenger supply unit to press the buttons provided therein in order to switch on or off the reading light or to call a flight attendant. Therefore, for these aircraft models the input device of the passenger supply unit, in particular the buttons, have been moved from the passenger supply unit in the ceiling section of the aircraft cabin to the in-flight entertainment system (IFE) provided e.g. on the back of a seat in front of each passenger seat, or have been provided in the IFE in addition to the PSU. However, many airlines prefer to have no in-flight entertainment system provided in their aircrafts. Also, an interface between the passenger supply unit and the in-flight entertainment system is required in these cases and the in-flight entertainment system needs to be modified, thereby complicating design, installation and maintenance and, thus, increasing costs of both the in-flight entertainment system and the passenger supply unit.

SUMMARY

Accordingly, an object of the present disclosure is to provide a passenger supply unit that can be controlled by a passenger independent of its distance above the passenger seat, and that is constructed considerably simple and does not require to implement additional controls in an in-flight entertainment system.

This object is achieved in that the input device comprises a contact free sensor configured to detect the control command without being contacted by a passenger. By such a contact free sensor a passenger does not need to actually contact the input device in order to e.g. touch or press a button, but can merely perform an act, e.g. move his hand or speak, that is detected by the contact free sensor, and thereby trigger the control signal without any direct contact to the input device of the passenger supply unit. In such a way, a passenger can control the passenger supply unit and, thus, the further device no matter if he can actually reach to the passenger supply unit, so that a passenger supply unit can be easily controlled by a passenger also in the case of aircraft models where the passenger supply unit is installed too high above a passenger seat to be reached by the passenger when seated.

According to a preferred embodiment, the input device comprises a plurality of contact free sensors. Preferably, at least one contact free sensor is assigned to each one passenger seat in a related row of passenger seats in an aircraft cabin. Preferably, at least one contact free sensor is arranged above the assigned seat or is arranged in such a pattern that the assigned seat becomes apparent to a passenger. In such a way, each passenger, when seated on his seat, has at least one contact free sensor assigned to his seat in order to detect his control commands. However, it might also be preferred that a single contact free sensor is provided in a passenger supply unit and configured to detect control commands from two or more different passenger seats.

According to a further preferred embodiment, the further device comprises or is formed as a reading light. The reading light is preferably arranged in the passenger supply unit. The control command preferably corresponds to switching between an ON state and an OFF state of the reading light. I.e. the control signal controls the switching of the reading light between ON and OFF state. In such a way, the reading light of a passenger supply unit can be controlled by a passenger without needing to reach to the passenger supply unit for direct contact.

In particular, it is preferred that a plurality of reading lights is provided. Preferably, at least one reading light is assigned to each one passenger seat in a related row of passenger seats in an aircraft cabin. Further preferred, at least one contact free sensor is assigned to each one reading light. In such a way, each passenger, when seated on his passenger seat, can control his own assigned reading light in a contact free manner, and it is provided that no other reading lights assigned to other seats are controlled unintentionally.

It is further preferred, that the input device is configured to control the further device such that when a control command corresponding to switching between an ON state and an OFF state of the reading light is detected by the contact free sensor, before fully switching between ON state and OFF state of the reading light, the reading light is dimmed up or down during a feedback phase of a predefined time. Preferably, when no further control command is detected by the contact free sensor during the feedback phase, the control signal corresponding to switching between ON state and OFF state of the reading light is output to the reading light when the feedback phase has lapsed. However, when a further control command in this regard is detected by the contact free sensor during the feedback phase, the reading light is dimmed in the opposite direction, i.e. up or down, or the dimmed state is stopped and the reading light returns to the ON/OFF state before dimming. In such a way, during the feedback phase a passenger can reconsider and correct his control command before it is fully implemented. As an alternative to the dimming, the reading light might also be blinking or lighted with a different color during the feedback phase.

It is also preferred that the input device is configured to control the further device such that when a control command corresponding to switching between an ON state and an OFF state of the reading light is detected by the contact free sensor, the reading light is dimmed up or down as long as the control command is detected, and maintains its light level when the control command is not detected any longer. In such a way, the reading light can be dimmed by a passenger to a desired light level in a very simple and convenient way.

In a preferred embodiment, the further device comprises or is formed as a passenger call display, such as a lamp. Preferably, the passenger call display is arranged in the passenger supply unit. Alternatively, it might also be arranged in a flight attendant area, such as a galley, or in a flight attendant panel. Preferably, the control command corresponds to setting off a passenger call to a flight attendant. I.e., the control signal controls the passenger call display to indicate a passenger call. In such a way, a passenger, when seated on his passenger seat, can set off a passenger call without actually needing to reach the passenger supply unit. The passenger call display can be provided in the passenger supply unit and controlled by the contact free sensor alternatively or additionally to the reading light.

In particular, it is preferred that a plurality of passenger call displays is provided. Preferably at least one passenger call display is assigned to each one passenger seat in a related row of passenger seats in an aircraft cabin. Further preferred, at least one contact free sensor is assigned to each one passenger call display. In such a way, each passenger, when seated on his seat, can control his own assigned passenger call display in a contact free manner. However, it is also preferred that less passenger call displays than passenger seats are provided, so that one passenger call display is assigned to two or more seats. For example, two passenger call displays might be assigned to three seats, so that one passenger call display is assigned to two seats.

It is further preferred, that the input device is configured to control the further device such that when a control command corresponding to a passenger call is detected by the contact free sensor, before actually indicating the passenger call at the passenger call display, the passenger call display is blinking during a feedback phase of a predefined time. Preferably, when no further control command is detected by the contact free sensor during the feedback phase, the control signal corresponding to indicating the passenger call at the passenger call display is output to the passenger call display when the feedback phase has lapsed. However, when a further control command in this regard is detected by the contact free sensor during the feedback phase, the blinking state is stopped and the passenger call display returns to the ON/OFF state before blinking. In such a way, during the feedback phase a passenger can reconsider and correct his control command before it is actually implemented. As an alternative to the blinking, the passenger call display might also be dimmed or lighted with a different color during the feedback phase.

According to a preferred embodiment, the further device comprises or is formed as an automatic window shade system provided at a window in an aircraft cabin. Preferably, the automatic window shade system comprises a window shade and a motor for moving the window shade between a closed position, where the window shade covers a window, and an opened position, where the window shade does not cover the window. Preferably, the control command corresponds to switching between the opened position and the closed position of the window shade. I.e., the control signal controls the automatic window shade system for switching between the opened and closed position of the window shade. In such a way, the passengers in the seat row next to the window can control the position of the window shade without needing to reach up and contact the passenger supply unit. Also, intermediate positions between the opened position and the closed position are possible, wherein in order to control the direction in which the window shade is to be moved out of an intermediate position, either two separate contact free sensors are provided each assigned to one direction, or the direction of movement of e.g. a hand of a passenger is detected.

As an alternative to the window shade that is moved by a motor, the window might also be shaded by a controllable layer applied to the window glass, wherein the controllable layer is controllable by the control command between an opened state, where light can pass through the window, and a closed state, where light cannot pass through the window.

According to another preferred embodiment, the input device is connected to a cabin management system (CIDS). Preferably, the cabin management system is configured to store the control commands and/or to display the control commands, e.g. on a flight attendant panel. In such a way, the state of the reading light, a passenger call or the position of the window shade can be monitored by the flight attendants without walking through the aisle and checking each passenger seat.

In yet another preferred embodiment, the contact free sensor is formed as a proximity sensor. The proximity sensor is preferably configured to detect a finger of a passenger pointing to the proximity sensor or a hand of a passenger near the proximity sensor. The proximity to be detected by the proximity sensor preferably reaches between 5 cm and 60 cm, further preferred between 40 cm and 20 cm, most preferred around 30 cm. Such a proximity sensor is a simple and reliable form of a contact free sensor.

In particular, it is preferred that the proximity sensor comprises an optical sensor, preferably an infrared sensor. Such a sensor is very effective and simple at the same time. Additionally or alternatively, the proximity sensor may preferably comprise an ultrasonic sensor. Additionally or alternatively, it is preferred that the proximity sensor comprises a camera sensor, wherein camera images are recorded and analyzed. These sensors represent simple and reliable options for proximity sensors adequate for the intended use.

Alternatively, it is preferred that the contact free sensor is formed as a speech recognition sensor. The speech recognition sensor preferably comprises a microphone, which can be included e.g. in a loudspeaker provided in the passenger supply unit. Such a speech recognition sensor is an adequate alternative to a proximity sensor. In order to control a specific further device out of a plurality of further devices, the further devices could e.g. be assigned numbers, so that a specific number could be named in a control command.

In yet another preferred embodiment, the input device comprises a contact sensor, such as a touch sensor or a mechanical button, configured to detect the control command additionally or alternatively to the contact free sensor. In such a way, tall passengers which may reach up to the passenger supply unit can choose which way to input the control command, namely by either contacting the contact sensor, i.e. pressing the button, as it is common in the art, or by triggering the contact free sensor without contact to the passenger supply unit, e.g. by lifting a hand.

A further aspect of the present disclosure relates to an aircraft cabin comprising a passenger seat in a row of passenger seats, and a ceiling section arranged above the passenger seat. Preferably, a passenger supply unit according to any of the afore-described embodiments is provided in the ceiling section above the passenger seat. The features, properties and advantages mentioned in connection with the passenger supply unit also apply to the aircraft cabin arrangement including the passenger supply unit.

BRIEF DESCRIPTION OF THE DRAWINGS

A preferred embodiment of the present disclosure is described in the following in more detail in connection with a drawing. The drawing shows in:

FIG. 2 a detailed side view of the aircraft cabin of FIG. 1, wherein a passenger is seated on a passenger seat with a passenger supply unit above his head; and FIG. 3 a perspective isolated view of the passenger supply unit shown in FIGS. 1 and 2.

DETAILED DESCRIPTION

Figure 1:
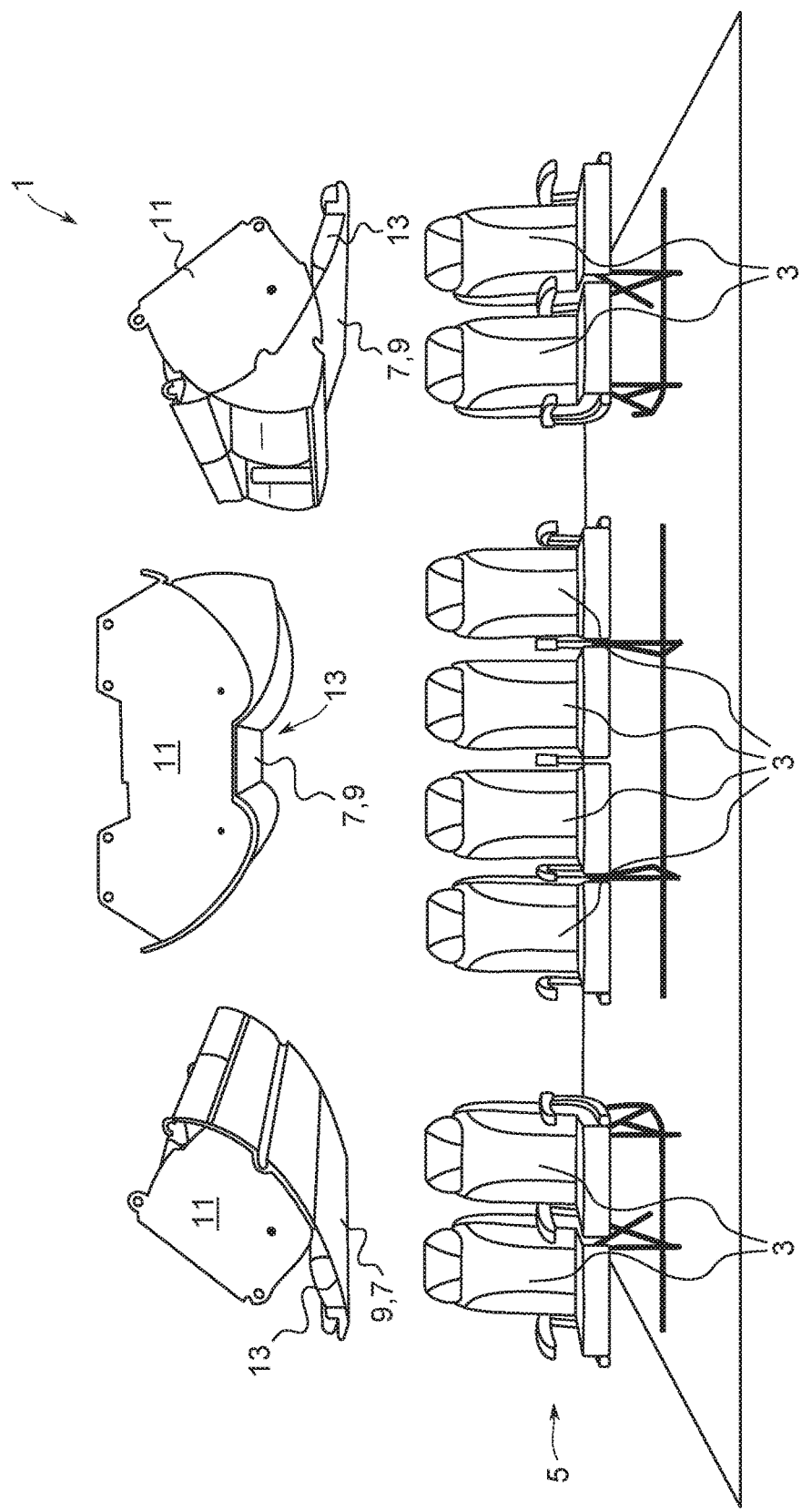
FIG. 1 a cross sectional view of an aircraft cabin comprising a passenger supply unit according to an embodiment of the present disclosure.

In FIG. 1 an embodiment of an aircraft cabin 1 according to the present disclosure is shown. The aircraft cabin 1 comprises a plurality of passenger seats 3 arranged in rows 5 of passenger seats 3, and a ceiling section 7 arranged above each passenger seat 3. In the present embodiment, the ceiling section 7 is formed by the lower trim 9 of the head racks 11, but in general can be formed by any structure or trim element extending above the passenger seats 3. In the ceiling section 7 above the passenger seats 3 a passenger supply unit 13 is installed, as shown in more detail in FIG. 2. As shown in FIG. 3, the passenger supply unit 13 comprises a loudspeaker 15, reading lights 17 and passenger call displays 19, wherein one reading light 17 is assigned to each one passenger seat 3 below the passenger supply unit 13. The passenger supply unit 13 further comprises an input device 21 configured for detecting a control command from a passenger 23 and for outputting a control signal to a further device 25 for controlling the further device 25 according to the control command, wherein in the present embodiment the further device 25 comprises the reading light 17, the passenger call display 19 and an automatic window shade system 27, as shown in FIGS. 2 and 3.

As shown in FIGS. 1 and 2, the ceiling section 7 with the passenger supply unit 13 installed therein is located so high above the passenger seats 3 in the present embodiment of the aircraft cabin 1, that a passenger 23 can hardly reach an input device 21 of the passenger supply unit 13 in order to input a control command to control, i.e. switch on or off, the reading light 17 or the passenger call display 19.

Therefore, the input device 21 comprises a contact free sensor 29 configured to detect the control command without being contacted by a passenger 23. In the present embodiment, the contact free sensor 29 is formed as a proximity sensor, in particular an infrared sensor, detecting a finger or a hand of a passenger 23 in the proximity of the proximity sensor, preferably within a range of about 30 cm from the proximity sensor. Alternatively, the proximity sensor can be formed as an ultrasonic sensor or a camera sensor. As an alternative to the proximity sensor the contact free sensor 29 can also be formed as a speech recognition sensor. In order to process the control commands detected by the contact free sensor 29, the passenger supply unit 13 also comprises a processing unit 31. In addition to the contact free sensor 29, the input device 21 might also comprise a contact sensor 32, such as a touch sensor or a mechanical button, configured to detect the control command in addition to the contact free sensor 29.

As explained above, the further device 25 comprises a reading light 17, a passenger call display 19 and an automatic window shade system 27. The reading light 17 is arranged in the passenger supply unit 13, as shown in FIGS. 2 and 3. The control command corresponds to switching between an ON state and an OFF state of the reading light 17, such that the control signal controls the switching of the reading light 17 between ON and OFF state. The input device 21 is configured to control the further device 25 such that when a control command corresponding to switching between an ON state and an OFF state of the reading light 17 is detected by the contact free sensor 29, before fully switching between ON state and OFF state of the reading light 17, the reading light 17 is dimmed during a feedback phase of a predefined time. When no further control command is detected by the contact free sensor 29 during the feedback phase, the control signal corresponding to switching between ON state and OFF state of the reading light 17 is output to the reading light 17 when the feedback phase has lapsed.

The passenger call display 19 is arranged in the passenger supply unit 13, as shown in FIG. 3. The control command in the case of the passenger call display 19 corresponds to setting off a passenger call to a flight attendant, so that the control signal controls the passenger call display 19 to indicate a passenger call. The input device 21 is configured to control the further device 25 such that when a control command corresponding to a passenger call is detected by the contact free sensor 29, before actually indicating the passenger call to the passenger call display 19, the passenger call display 19 is blinking during a feedback phase of a predefined time. When no further control command is detected by the contact free sensor 29 during the feedback phase, the control signal corresponding to indicating the passenger call at the passenger call display 19 is output to the passenger call display 19 when the feedback phase has lapsed.

The automatic window shade system 27 is provided at a window 33 of the aircraft cabin 1, as shown in FIG. 2. The automatic window shade system 27 comprises a window shade 35 and a motor 37 for moving the window shade 35 between a closed position, where the window shade 35 covers a window 33, and an opened position where the window shade 35 does not cover the window 33. The control command in the case of the automatic window shade system 27 corresponds to switching between the opened position and the closed position of the window shade 35, such that the control signal controls the automatic window shade system 27 for switching between the opened and the closed position of the window shade 35, wherein also intermediate positions are possible.

The input device 21 is connected to a cabin management system 39 provided in the aircraft cabin 1. The cabin management system 39 is configured to store the control commands and to display the control commands to the flight attendants, e.g. on a flight attendant panel. Passenger calls or other control commands of the passengers 23 can be monitored remotely by the flight attendants in such a way.

The subject matter disclosed herein can be implemented in software in combination with hardware and/or firmware. For example, the subject matter described herein can be implemented in software executed by a processor or processing unit. In one exemplary implementation, the subject matter described herein can be implemented using a computer readable medium having stored thereon computer executable instructions that when executed by a processor of a computer control the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A passenger supply unit for an aircraft cabin, comprising:
    an input device configured for detecting a control command from a passenger, and for outputting a control signal to one or more further devices for controlling the one or more further devices according to the control command;
    the input device comprising a contact free sensor configured to detect the control command without being contacted by a passenger;
    wherein the input device is further configured to transmit the control signal after a feedback phase of a predefined time has lapsed;
    wherein the one or more further devices comprises a reading light;
    wherein the control command corresponds to switching between an ON state and an OFF state of the reading light;
    wherein the input device is configured to control the one or more further devices such that when a control command corresponding to switching between an ON state and an OFF state of the reading light is detected by the contact free sensor, before fully switching between ON state and OFF state of the reading light, the reading light is dimmed during the feedback phase;
    wherein when no further control command is detected by the contact free sensor during the feedback phase, the input device is configured to transmit the control signal corresponding to switching between ON state and OFF state of the reading light to the reading light when the feedback phase has lapsed; and
    wherein when a further control command is detected by the contact free sensor during the feedback phase, the reading light is dimmed in an opposite direction, or the dimmed state is stopped and the reading light returns to the ON or OFF state.

2. The passenger supply unit according to claim 1, wherein the input device comprises a plurality of contact free sensors, and
    wherein at least one contact free sensor is assigned to each one passenger seat in a related row of passenger seats in an aircraft cabin.

3. The passenger supply unit according to claim 1, wherein the reading light is arranged in the passenger supply unit.

4. The passenger supply unit according to claim 3, wherein a plurality of reading lights are provided,
    wherein at least one reading light is assigned to each one passenger seat in a related row of passenger seats in an aircraft cabin, and
    wherein at least one contact free sensor is assigned to each one reading light.

5. The passenger supply unit according to claim 1, wherein the one or more further devices comprises a passenger call display,
    wherein the passenger call display is arranged in the passenger supply unit, and
    wherein the control command corresponds to setting off a passenger call.

6. The passenger supply unit according to claim 5, wherein a plurality of passenger call displays are provided,
    wherein at least one passenger call display is assigned to each one passenger seat in a related row of passenger seats in an aircraft cabin, and
    wherein at least one contact free sensor is assigned to each one passenger call display.

7. The passenger supply unit according to claim 5, wherein the input device is configured to control the one or more further devices such that when a control command corresponding to a passenger call is detected by the contact free sensor, before actually indicating the passenger call at the passenger call display, the passenger call display is blinking during the feedback phase; and
    wherein when no further control command is detected by the contact free sensor during the feedback phase, the input device is configured to transmit the control signal corresponding to indicating the passenger call at the passenger call display to the passenger call display when the feedback phase has lapsed.

8. The passenger supply unit according to claim 1, wherein the one or more further devices comprises an automatic window shade system provided at a window in an aircraft cabin,
    wherein the automatic window shade system comprises a window shade and a motor for moving the window shade between a closed position, where the window shade covers a window, and an opened position, where the window shade does not cover the window, and
    wherein the control command corresponds to switching between the opened position and the closed position of the window shade.

9. The passenger supply unit according to claim 1, wherein the contact free sensor is formed as a proximity sensor.

10. The passenger supply unit according to claim 9, wherein the proximity sensor comprises an optical sensor or an ultrasonic sensor or a camera sensor.

11. The passenger supply unit according to claim 1, wherein the contact free sensor is formed as a speech recognition sensor.

12. The passenger supply unit according to claim 1, wherein the input device further comprises a contact sensor configured to detect the control command.

13. The passenger supply unit of claim 1, wherein the predetermined time of the feedback phase is sufficiently long to allow a passenger to reconsider or correct the passenger's control command before the control signal is transmitted.

14. The passenger supply unit of claim 1, wherein the input device is connected to a cabin management system, and
wherein the cabin management system is configured to store and display the control commands.

15. An aircraft cabin comprising one or more passenger seats and a ceiling section arranged above the one or more passenger seats,
wherein a passenger supply unit is provided in the ceiling section above the passenger seat;
wherein the passenger supply unit comprises:
an input device configured for detecting a control command from a passenger, and for outputting a control signal to one or more further devices for controlling the one or more further devices according to the control command;
the input device comprising a contact free sensor configured to detect the control command without being contacted by a passenger; and
wherein the input device is further configured to transmit the control signal after a feedback phase of a predefined time has lapsed;
wherein the one or more further devices comprises a reading light;
wherein the control command corresponds to switching between an ON state and an OFF state of the reading light;
wherein the input device is configured to control the one or more further devices such that when a control command corresponding to switching between an ON state and an OFF state of the reading light is detected by the contact free sensor, before fully switching between ON state and OFF state of the reading light, the reading light is dimmed during the feedback phase;
wherein when no further control command is detected by the contact free sensor during the feedback phase, the input device is configured to transmit the control signal corresponding to switching between ON state and OFF state of the reading light to the reading light when the feedback phase has lapsed; and
wherein when a further control command is detected by the contact free sensor during the feedback phase, the reading light is dimmed in an opposite direction, or the dimmed state is stopped and the reading light returns to the ON or OFF state.

16. The aircraft cabin of claim 15, wherein the predetermined time of the feedback phase is sufficiently long to allow a passenger to reconsider or correct the passenger's control command before the control signal is transmitted.

17. The aircraft of claim 15, wherein the input device is connected to a cabin management system, and
wherein the cabin management system is configured to store and display the control commands.

* * * * *